United States Patent [19]

Price et al.

[11] 4,225,949
[45] Sep. 30, 1980

[54] METHOD OF AND APPARATUS FOR NAVIGATING UNMARKED CHANNELS

[75] Inventors: Douglas R. Price, Ruxton, Md.; Frederick F. Dalessio, Aston; Phillip H. Jones, Glenolden, both of Pa.

[73] Assignee: Atlantic Development Company, Adelphi, Md.

[21] Appl. No.: 952,218

[22] Filed: Oct. 17, 1978

[51] Int. Cl.² .............................................. G01S 9/68
[52] U.S. Cl. ........................................ 367/96; 367/97; 367/108; 367/111; 367/112
[58] Field of Search ...................... 340/1 C, 3 C, 3 E; 367/96, 97, 108, 111, 112, 113, 114, 115

[56] References Cited

U.S. PATENT DOCUMENTS

| | | | |
|---|---|---|---|
| 2,366,800 | 1/1945 | Norrman | 367/114 X |
| 3,267,417 | 8/1966 | Galloway | 367/113 |
| 3,304,532 | 2/1967 | Nelkin et al. | 367/115 X |
| 3,475,721 | 10/1969 | Cappel, Jr. et al. | 367/124 |
| 3,505,638 | 4/1970 | Watson | 367/125 |
| 3,539,978 | 11/1970 | Stedtnitz | 367/108 |
| 3,722,447 | 3/1973 | Altar et al. | 367/96 |
| 3,766,518 | 10/1973 | Rilett | 367/112 |
| 3,942,149 | 3/1976 | Westfall, Jr. | 367/108 |

Primary Examiner—Richard A. Farley
Attorney, Agent, or Firm—Lowe, King, Price & Becker

[57] ABSTRACT

In an apparatus for guiding or controlling a vessel over the center of an unmarked channel, a pair of ultrasonic transducers are mounted athwartship on the hull of the vessel and directed downwardly to transmit ultrasonic pulses and to receive corresponding pulses reflected from the floor of the body of water. Time durations between transmitted and corresponding received pulses are measured to determine floor or channel depth below the port and starboard sides of the vessel. The depths are digitally encoded and supplied to a comparator which generates a signal indicating whether deeper water is port or starboard of the vessel. The comparator signal is supplied to a display to instruct the navigator whether to steer port, starboard or to maintain course to guide the vessel over the center of the channel. The comparator signal may be also supplied to a rudder servo to automatically steer over the channel center. A digital filter is provided to eliminate any spurious readings obtained by the transducers.

20 Claims, 7 Drawing Figures

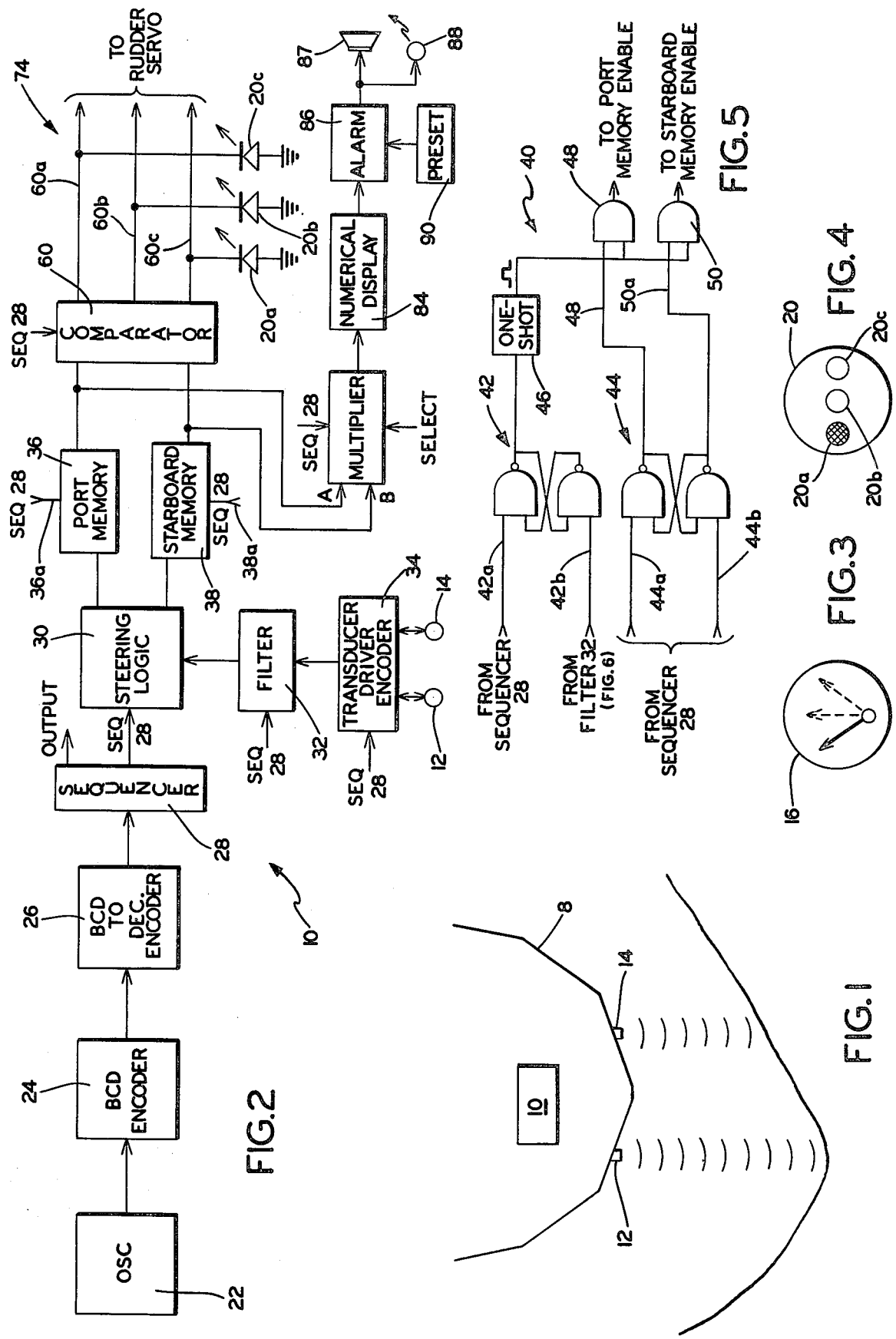

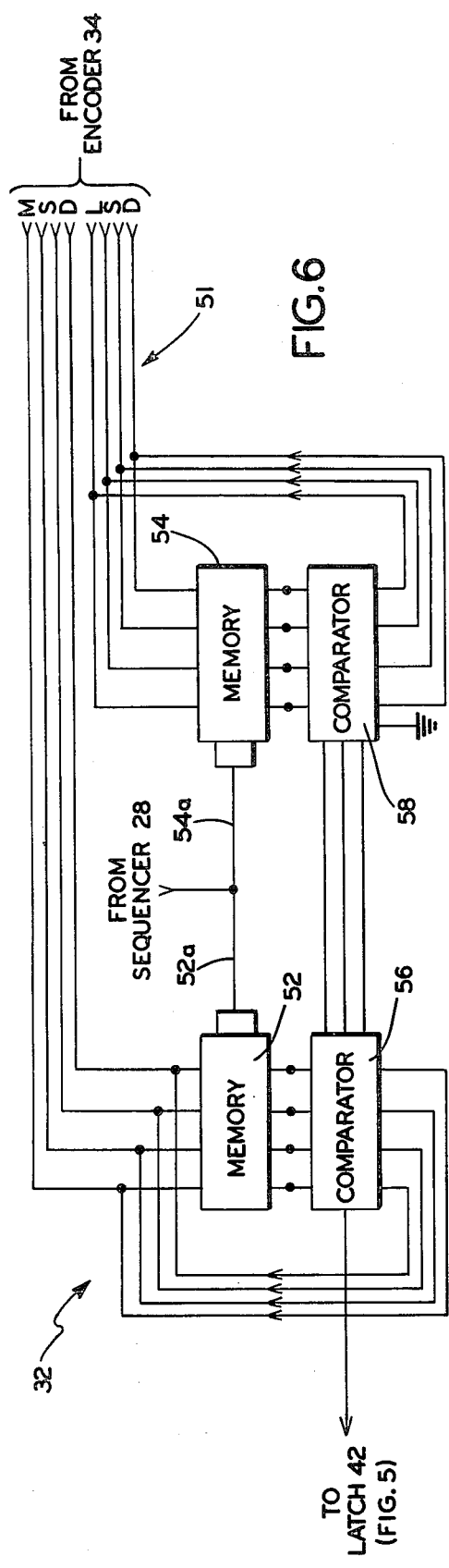
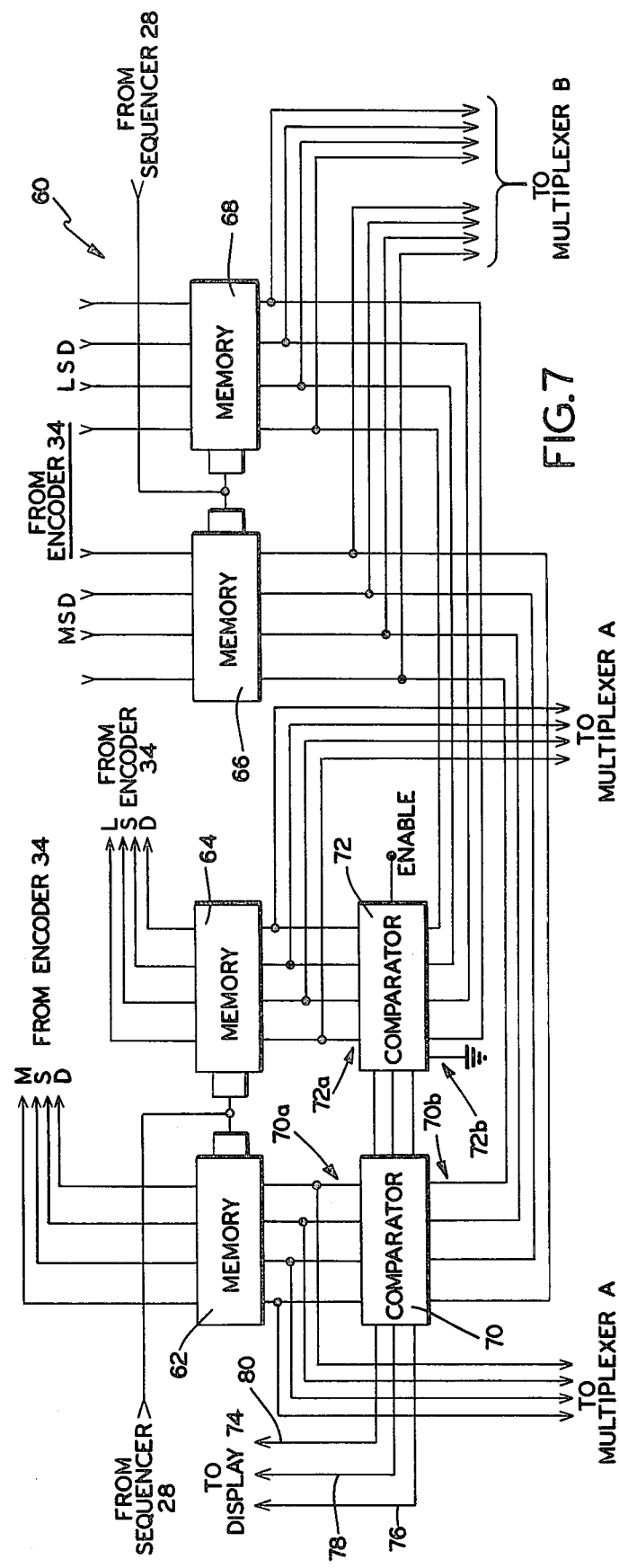

METHOD OF AND APPARATUS FOR NAVIGATING UNMARKED CHANNELS

TECHNICAL FIELD

The present invention relates generally to channel navigation, and more particularly, toward a method of and apparatus for automatically guiding or controlling a vessel over the center of an unmarked channel.

BACKGROUND ART

It is important to maintain a deep draft vessel over the center of a narrow channel to prevent the vessel from going aground, which occurs when the hull of the vessel actually strikes and becomes imbedded in the wall of the channel. Navigation of a channel is typically made by observing center channel markers, or buoys, which are positioned to identify the approximate location of the edge of the channel and thereby define a pathway for floating vessels over channel center. Guiding a vessel over the center of a channel is sometimes difficult, however, because the channel markers are widely spaced and obscurred by poor visibility. Thus, unless the navigator has had prior experience in the channel, there is a good likelihood that his course will depart from the center of the channel.

In practice, the navigator will generally rely on his depth monitor to assure that the depth of the channel is always greater than the draft of the vessel. Conventional depth monitors, however, only determine depth at one point. A single point depth reading does not inform the navigator where the vessel is located within the channel. Even though the depth reading on a conventional depth monitor will show that the vessel is venturing into shallow water at a channel, the navigator frequently is unsure on which side of the center of the channel the vessel is located, and he therefore does not know which way to steer the vessel to find channel center.

A need therefore exists for instrumentation that identifies the position of a vessel within a channel and indicates to a navigator a steering position for guiding the vessel to and maintaining the vessel above the center or deepest part of the channel. Because steering direction often must be determined almost instantaneously to avoid going aground, a need further exists for instrumentation that displays a single steering direction command, i.e., port, starboard or maintain course, to the navigator or generates an automatic rudder control, to maintain the vessel in channel center.

Accordingly, one object of the invention is to provide a method of and apparatus for indicating the position of a vessel within a channel.

Another object is to provide a method of and apparatus for automatically determining the position of a vessel within a channel and displaying steering commands for guiding the vessel with respect to the channel center.

Another object is to provide a method of and apparatus for automatically determining the location of the center or deepest part of a channel with respect to a vessel and for generating steering command signals for guiding the vessel over the channel center.

Another object is to provide a method of and apparatus for determining the center or deepest part of the channel with respect to the vessel and for generating steering control signals for automatically guiding the vessel over the channel center.

Another object is to provide a method of and apparatus for channel navigation usable in unmarked channels and providing unambiguous display of steering directions to the navigator so that course correction can be undertaken immediately.

In U.S. Pat. No. 3,267,417 to Galloway, a navigation system for maintaining a vessel over channel center comprises a series of transponders located on the floor of the deepest part of the channel, a pulse transmitter located at the bow of the vessel and directed toward the transponders and a pair of hydrophones mounted athwartship and equally distant from the center line of the vessel. The transmitter transmits beams that are reflected from the channel transponders and received by the hydrophones to generate steering signals for maintaining the vessel in channel center. The Galloway system, however, requires that the channel be marked with transponders for the purpose of reflecting beams generated by the vessel-carried transmitter. The system is not usable for navigation in unmarked channels.

Another object of the invention, therefore, is to provide a channel navigation system that requires no external channel marking.

Another object is to provide a center channel navigation system that is usable with respect to unmarked channels and requires no apparatus external to the vessel.

DISCLOSURE OF INVENTION

In accordance with the invention, first and second ultrasonic transducers are mounted athwartship and equally spaced from the center line of a vessel. Each of the transducers is directed downwardly to the floor of the channel beneath the port and starboard sides of the vessel. The transducers are operated to generate successive bursts of ultrasonic energy that are reflected from the channel floor and subsequently received by the transducers, the two transducers being operated alternately to avoid cross talk or interference by the reflected pulses. Time durations between transmitted and received, reflected pulses are measured to determine the depth of the channel floor below each side of the vessel. First and second electrical signals indicative of the two channel depth readings are supplied to displays which visually indicate the numerical depth of the channel under each side of the vessel. The electrical signals are also compared to determine the direction of the slope of the channel floor below the vessel. The result of the comparison is used to generate a third electrical signal which identifies the side of the vessel which is over deeper water. The third electrical signal is supplied to another display having discrete outputs that call for a port, starboard or maintain course steering direction to navigate the vessel over the channel center. The third signal may alternatively be supplied to a rudder servo for directly controlling the vessel steering.

The two transducers are alternately addressed by control circuitry for operating the transducers in transmit and receive modes. Addressing of the transducers by the control circuitry is synchronized to a free running multivibrator. Logic circuitry, also synchronized to the oscillator, controls conversion of pulse propagation time durations to channel depths, compares the depths to determine channel center location and controls the display or servo control for commanding steering direction.

Still other objects and advantages of the present invention will become readily apparent to those skilled in this art from the following detailed description, wherein we have shown and described only the preferred embodiment of the invention, simply by way of illustration of the best mode contemplated by us of carrying out our invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIG. 1 shows a vessel having a pair of transducers and circuitry, in accordance with the invention, for determining the position of the vessel within a channel;

FIG. 2 is a block diagram of the circuitry for controlling operation of the transducer shown in FIG. 1 and for displaying steering directions or controlling steering to maintain the vessel above the center of the channel;

FIGS. 3 and 4 show two alternative displays for indicating port, starboard or maintain course steering directions to the navigator, in accordance with the invention;

FIG. 5 is a circuit diagram showing details of the steering logic block illustrated in FIG. 2;

FIG. 6 is a circuit diagram showing details of the filter block illustrated in FIG. 2, and FIG. 7 is a circuit diagram showing details of the comparator block illustrated in FIG. 2.

BEST MODE FOR CARRYING OUT THE INVENTION

Referring to FIG. 1, a floating vessel 8 is shown positioned above and rightward of the center of the deepest part of a channel so that the floor of the channel directly below the vessel has a positive slope or rate of change of depth in the starboard direction with respect to the vessel. A pair of ultrasonic transducers 12 and 14 are mounted athwartship of the vessel 8 equally spaced from the center of the hull. The transducers 12 and 14 are preferably separated from each other on the vessel 8 as far as possible while being maintained below the water line for coupling of ultrasonic energy into the water. The transducers 12 and 14 are preferably positioned on the vessel 8 so as to direct pulses of energy vertically toward the channel floor, as shown in FIG. 1.

Each of the detectors 12 and 14 is preferably a conventional ultrasonic transducer that converts electrical oscillations into ultrasonic energy that is directed toward the channel floor and also converts ultrasonic energy reflected from the floor of the channel to electrical signals. The ultrasonic energy is transmitted in the form of pulses, so that time durations between transmitted and corresponding received pulses having a known propagation speed that have been reflected from the channel floor are correlated to channel depth. Operation of the transducers 12 and 14 between the transmit and receive modes is well known to persons of ordinary skill in the art, and therefore not described herein in detail.

In accordance with the invention, circuitry 10 is provided within the vessel 8 to measure channel depth below each of the transducers 12 and 14 in a conventional manner and then to compare the depth measurements to determine whether deeper water is port or starboard of the vessel. The circuitry 10 generates signals to command a steering direction to the navigator or to control a rudder servo for guiding the vessel into deeper water toward the center of the channel. In order to provide a readout that can be immediately interpreted by the navigator, the signals generated by circuit 10 provide single commands corresponding to port, starboard or maintain course steering directions on discrete displays such as the ones shown in FIGS. 3 and 4. The discrete displays require no interpretation by the navigator as conventional depth monitors do; steering commands are given directly.

In FIG. 3, an analog gauge 16 has a pointer 18 with a left position 18A (shown in solid line) calling for port steering, a vertical position 18B (dotted line) calling for maintain course steering and a right position 18C (dotted line) calling for starboard steering. In FIG. 4, single indicator light emitting or modulating elements such as 20A, 20B and 20C call, respectively, for the port, maintain course and starboard steering directions. Depending upon the position of vessel 8 within the channel, one of the above three steering commands is always generated to maintain the vessel over the deepest part. In FIG. 1, for example, with the center of the channel located port of vessel 8, a port steering direction is required to relocate the vessel over the center of the channel. The indicators 16 and 20 shown, respectively, in FIGS. 3 and 4 thus call for the port steering direction.

Referring to FIG. 2, oscillator 22 is a low frequency, free running multivibrator that generates square waves at an exemplary frequency of about two Hz. as a timing signal for the signal processing circuitry shown. The output of oscillator 22 is connected to a conventional binary coded decimal (BCD) encoder 24 which converts square waves generated by the oscillator to successively increasing binary coded decimal numbers which are supplied to the input of a BCD-to-decimal encoder 26. Encoder 26, in response to the binary coded decimal data generated by encoder 24, generates decimal signals in a conventional manner to a digital sequencer 28. BCD encoder 24 may be, for example, a type 7490 integrated circuit, and BCD-to-decimal encoder 26 may be a type 7442 integrated circuit, both manufactured by Texas Instruments.

Sequencer 28 is composed of conventional digital logic circuitry that generates digital signals sequentially and in predetermined order on preselected ones of a plurality of output leads for controlling the states of control gates that operate the various circuit elements shown in FIGS. 5–7 as well as in FIG. 2. Although only a single output lead is shown with respect to sequencer 28, the actual number of output leads corresponds to the preselected number of sequence steps n needed for operation of the circuit 8. In practice, I made n=20, although a larger number of sequence steps may be used to provide additional functions in accordance with particular requirements. In each case, the sequencer 28 comprises an array of logic gates interconnected in a conventional manner to generate unique or redundant control signals for controlling the circuit functions described infra in response to decimal signals supplied thereto by converter 26. Since digital sequencers are well known to persons of ordinary skill in the art, the logic array of which sequencer 28 is composed is not described in detail for brevity.

The output of sequencer 28 is connected to steering logic 30 as well as to a digital filter 32 and a conventional transducer driver/encoder circuitry 34. The port and starboard transducers 12 and 14 are wired to the transducer circuitry 34 that controls transmission of pulses by alternately applying high frequency current bursts or pulses to the transducers at first and second frequencies, receiving corresponding, reflected pulses, measuring time delays between transmitted and corresponding received pulses, correlating the time delays to depths and then generating digital signals indicative of depth under each transducer, in a manner disclosed in U.S. Pat. No. 3,942,149 to Westfall, Jr. The depth "readings" in driver/encoder 34 are supplied to port and starboard memory circuits 36 and 38 through the steering logic 30. The steering logic 30 causes the encoded depth readings from port transducer 12 to be stored in port memory 36 and causes the starboard depth readings from transducer 14 to be stored in starboard memory 38.

Steering logic 30 is controlled by sequencer 28 in synchronism with addressing of the transducers 12 and 14. Referring to FIG. 5, the steering logic comprises a first latch 42 and a second latch 44 composed of cross coupled pairs of NAND gates, as shown. One input 42a of latch 42 is connected to sequencer 28, whereas the second input 42b to the latch is connected to the output of filter 32. Both inputs 44a, 44b to the second latch 44 are connected to the sequencer 28. The output of latch 42 is connected to a conventional one shot circuit 46 that generates a single, short duration pulse to one input of each of port memory enable gate 48 and starboard memory enable gate 50. The outputs of latch 44 are connected, respectively, to the remaining inputs of port memory enable gate 48 and starboard memory enable gate 50. The two outputs of latch 44 are complementary to each other, that is, when one output is at logic one, the remaining output is at logic zero. Thus, only one of the gates 48, 50 at a time can be enabled by latch 44 to generate a logic one "enable" signal to the port and starboard memories 36, 38.

A depth reading from port transducer 12 is stored in port memory 36 by the steering logic circuit 30 in response to the application of a control signal, generated by sequencer 28 on enable line 36a (FIG. 2). Similarly, a starboard reading from transducer 14 is stored in starboard memory 38 in response to the application of control signal generated by the sequencer 28 on enable line 38a. The sequencer 28 further controls the storage of depth readings in memories 36, 38 at the inputs of latches 42, 44. Thus, when port transducer 12 is being addressed by sequencer 28, a logic one signal is applied to input lead 44a of latch 44 and a logic zero signal is applied to input lead 44b. A logic one signal is also supplied to one input 48a of port memory enable gate 48 and a logic zero signal is supplied to corresponding input 50a of starboard memory enable gate 50. Only port memory enable gate 48 is thus readied to cause loading of port memory 36 in response to a sync signal generated by one shot 46, which is triggered by a depth reading signal at the output of filter 32.

For example, assume that the input 42a is initially caused to be at logic zero by sequencer 28 indicating that a depth reading is being called for and that input 42b from filter 32 switches from logic one to logic zero indicating that a depth reading has been received. The input to one shot 46 thus switches from logic one to logic zero which triggers the one shot 46 to generate a sync pulse gated by gate 48 through to the enable lead 36a of port memory 36 for storage therein of the digitally encoded port depth reading. The latch 42 is subsequently reset by sequencer 28 by reapplication of a logic zero signal to latch input 42a. Similarly, the digitally encoded starboard depth reading is stored in starboard memory 38 in response to a signal on latch lead 42b when sequencer 28 applies a logic one signal to lead 44b and a logic zero signal to lead 44c of latch 44. The application of control signals to latch 44 is synchronized to addressing of the port and starboard transducers 12 and 14 through driver/encoder 34 by the sequencer 28 such that the port transducer 12 and port memory 36 are simultaneously addressed, and similarly, the starboard transducer 14 and starboard memory 38 are simultaneously addressed.

The purpose of filter 32 is to eliminate spurious readings that have a tendency to occur with some particular sonic transducers in a depth sounding environment. These readings are known to be spurious rather than merely transient, since the transducers provide single readings of three or four times the actual depth. In order to eliminate the spurious depth readings, we have provided a digital filter 32 which continuously monitors the outputs of transducers 12 and 14, and accepts the output as being non-spurious only if two successive, equal readings are obtained. The filter 32 also has a tendency to eliminate short, transient decreases in depth readings caused by schools of fish passing under the vessel, for example, which should be ignored with respect to channel navigation.

Referring to FIG. 6, digital filter 32 comprises a pair of memories 52 and 54 for receiving and storing, respectively, the more significant digit (MSD) and less significant digit (LSD) of the digitally encoded depth readings generated by encoder 34 on data lines 51. The memories 52 and 54 are similar to memories 36 and 38 shown in FIG. 2, and are enabled by signals applied to enable leads 52a and 54a. The outputs of memories 52 and 54 are connected to the data inputs of comparators 56 and 58 corresponding to the MSD and LSD stored in the memories. The reference inputs to comparators 56 and 58 are connected directly to the MSD and LSD data lines 51, as shown. The comparators 56 and 58 thus compare a present depth reading generated by depth encoder 34 with a previously generated depth reading stored in the memories 52 and 54. Each time a reading is called for by sequencer 28, the present depth reading is compared to the previous depth reading in comparators 56 and 58. If the two readings are equal, comparators 56 and 58 generate a read command to input lead 42b of latch 42 (FIG. 5). If the present and previous readings are not equal, the present reading is presumed to be spurious and therefore ignored. The present reading is now stored in memories 52 and 54 under control of sequencer 28 for comparison with the subsequent depth reading. The latch 42 in FIG. 5 is inhibited from causing the spurious depth reading to be stored in either of the port and starboard memories 36, 38.

Referring again to FIG. 2, the port and starboard depth readings stored, respectively, in memories 36 and 38 are repetitively compared to each other in comparator 60 to develop a steering direction control or command signal. As discussed with respect to FIG. 1, supra, the larger depth reading represents the side of the vessel at which the channel center or deeper water is located. Accordingly, the vessel is to be steered in the direction of the larger depth reading to prevent its going aground. Referring to FIG. 7, comparator 60 comprises a pair of port memories 62 and 64 corresponding to the MSD and LSD, respectively, as well as starboard memories 66 and 68. The memories 62–68 are controlled by sequencer 28 to alternately store the port and starboard depth readings generated by the encoder 34 for comparison in comparators 70 and 72.

The outputs of port memories 62 and 64 are thus supplied to data inputs 70a, 72a of comparators 70 and 72 whereas the outputs of starboard memories 66 and 68 are connected to the reference inputs 70b, 72b of the comparators. The loading of memories 72 and 64 as well as enabling of comparators 70 and 72 is controlled by sequencer 28. The outputs of comparators 70 and 72 are supplied to a display 74 (see FIG. 2), corresponding to the gauges shown in FIGS. 3 and 4. In accordance with the embodiment shown in FIG. 2, LEDs 20A, 20B and 20C are connected to comparator output lines 76, 78 and 80 (FIG. 7). The comparators 70 and 72, which may be type 7485 integrated circuits manufactured by Texas Instruments, for example, generate a signal on lead 76 if the starboard depth reading is larger than the port depth reading, a signal on lead 78 if the two depth readings are equal or a signal on line lead 80 if the port depth reading is greater than the starboard depth reading. Thus, any one of the LEDs 20A, 20B or 20C is energized to indicate to the navigator the side of the vessel on which the channel center or deeper water is located. The center LED 20B is optional and may be omitted, whereby the absence of a signal on either of the remaining two LEDs 20A, 20C is equivalent to a maintain present course steering command.

The outputs of the port memories 62 and 64 as well as of the starboard memories 66 and 68 are also connected to a conventional multiplexer 82 (FIG. 1) which is gated in accordance with a "select" signal to display either or both of the port and starboard depth readings on a numerical display unit 84.

The numerical display unit is also wired to an alarm 86 which generates an audible signal through speaker 87 whenever the depth on either side of the vessel 8 as indicated by the output of multiplexer 82 is less than a reference depth stored in preset unit 90. Optionally, a flashing light 88 may be provided as alarm 86 to indicate shallow water on either side of the vessel 8.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

We claim:

1. A navigational apparatus for guiding a vessel above the deepest part of a channel, comprising:
    first and second transducer means mounted athwartship and equally spaced from the center of said vessel;
    means for operating said first and second transducer means to transmit energy pulses downwardly through the water to be reflected from the channel bottom;
    means for operating said first and second transducer means to receive the reflected energy pulses;
    means for filtering spurious signals received by said first and second transducer means;
    means for measuring a time duration between transmission of pulses and reception of corresponding, reflected pulses at each one of said transducers and for generating first and second electrical signals indicative respectively of channel depths on opposite sides of said vessel;
    means for comparing said first and second electrical signals;
    means for displaying a port, starboard or maintain course steering command; and
    means responsive to said comparing means for controlling said display means as a function of channel depth to display one of said steering commands depending upon the location of the deepest part of the channel relative to said vessel to enable guiding of said vessel above the deepest part of said channel.

2. The apparatus of claim 1, wherein said measuring means includes means for alternately enabling said first and second transducer means for transmitting and receiving pulses; and means for storing said first and second electrical signals developed during sample intervals for periodic comparison in said comparing means.

3. The apparatus of claim 1, wherein said display means includes an analog meter, and said display controlling means includes means for driving a pointer of said analog meter among left of center, center, and right of center, discrete pointer positions.

4. The apparatus of claim 1, wherein said display means includes two discrete, light emitting or modulating elements representing, respectively, port and starboard steering direction commands.

5. The apparatus of claim 4, wherein said display means includes an additional discrete, light emitting or modulating element representing a maintain course steering direction command.

6. The apparatus of claim 1, including means for numerically displaying channel depth below each of said transducer means.

7. The apparatus of claim 1, including alarm means for indicating when the channel depth measured below either one of said transducers is less than a preset, minimum safe depth.

8. The apparatus of claim 7, wherein said alarm means includes a blinking lamp.

9. The apparatus of claim 1, wherein each of said transducer means includes an ultrasonic transducer mounted on the bow of said vessel.

10. The apparatus of claim 2, wherein said measuring means includes gating means for alternately enabling said first and second transducer means for generating and receiving energy pulses, and oscillator means for causing said gating means to successively alternate between said transducer means.

11. The apparatus of claim 1, including means responsive to said comparing means for generating a steering control signal for maintaining said vessel above the center of the channel.

12. The apparatus of claim 11, including a steering servo responsive to said steering control signal, said servo being coupled to a rudder means of said vessel.

13. The apparatus of claim 1, wherein said filter means includes a digital filter including first means for comparing present depth readings with immediately previous depth readings developed by said transducer means and second means for generating said present depth reading as said first and second electrical signals only if said present and immediately previous depth readings are equal.

14. A navigational apparatus for guiding a vessel above the deepest part of a channel, comprising:
    first and second transducer means mounted athwartship and equally spaced from the center of said vessel;

means for operating said first and second transducer means to transmit energy pulses downwardly through the water to be reflected from the channel bottom;

means for operating said first and second transducer means to receive the reflected energy pulses;

means for filtering spurious signals received by said first and second transducer means;

means for measuring a time duration between transmission of pulses and reception of corresponding reflected pulses at each one of said transducers;

means for correlating said measured time durations to channel depths below said transducers;

means for generating first and second electrical signals indicative, respectively, of the channel depth below each transducer;

means for comparing said first and second electrical signals;

means responsive to said comparing means for generating a third electrical signal as a function of relative channel depths athwartship of said vessel, said third signal being indicative of position of said vessel with respect to the deepest part of the channel; and servo means responsive to said third electrical signal for controlling said vessel above the deepest part of said channel.

15. The apparatus of claim 14, wherein said filter means includes a digital filter including first means for comparing present depth readings with immediately previous depth readings developed by said transducer means and second means for generating said present depth reading as said first and second electrical signals only if said present and immediately previous depth readings are equal.

16. The apparatus of claim 14, including display means responsive to said third electrical signal for displaying a steering direction for guiding said vessel above the center of said channel.

17. A method of guiding a vessel above the deepest part of a channel, comprising the steps of measuring the depth of said channel under said vessel at port and starboard sides; generating first and second electrical signals indicative, respectively, of channel depths under said port and starboard sides; filtering said first and second signals to eliminate signals corresponding to spurious depth measurements; comparing said signals to determine the direction of the location of the deepest part of said channel with respect to said vessel and, in response to a result of said comparing step, displaying one of a port, starboard or maintain course steering command depending upon the location of the vessel relative to the deepest part of the channel.

18. The method of claim 17, including the step of generating a steering control signal in response to the result of the comparing step.

19. The method of claim 18, wherein the step of measuring includes the steps of generating vertical energy pulses downwardly to the channel bottom from athwartship locations on the hull of said vessel; receiving at said locations energy pulses reflected from the channel bottom; measuring time durations between transmitted and corresponding received, reflected pulses at each of said locations; and correlating said time durations to channel depths below said locations.

20. The method of claim 17, wherein said filtering step includes the steps of storing a previous port or starboard depth reading, comprising a present one of said port or starboard depth reading with said stored corresponding depth reading, and generating said first or second electrical signal for comparison only if said present and stored depth readings are equal.

* * * * *